(12) United States Patent
Herbig et al.

(10) Patent No.: US 10,597,233 B2
(45) Date of Patent: Mar. 24, 2020

(54) RAIL MODULE HAVING RAIL PORTIONS AND HAVING A LINEAR DRIVE, CARRIAGE FOR A RAIL MODULE AND RAIL TRANSPORT SYSTEM

(71) Applicant: ATL Systems GmbH, Pfungstadt-Eschollbrücken (DE)

(72) Inventors: Johannes Herbig, Pfungstadt (DE); Martin Kaltenbach, Essen (DE)

(73) Assignee: ATL Systems GmbH, Pfungstadt-Eschollbrücken (DE)

( * ) Notice: Subject to any disclaimer, the term of this patent is extended or adjusted under 35 U.S.C. 154(b) by 0 days.

(21) Appl. No.: 16/344,348

(22) PCT Filed: Oct. 24, 2017

(86) PCT No.: PCT/EP2017/077055
§ 371 (c)(1),
(2) Date: Apr. 23, 2019

(87) PCT Pub. No.: WO2018/077826
PCT Pub. Date: May 3, 2018

(65) Prior Publication Data
US 2019/0337726 A1    Nov. 7, 2019

(30) Foreign Application Priority Data

Oct. 24, 2016 (DE) .......................... 10 2016 120 257

(51) Int. Cl.
*B65G 35/06* (2006.01)
*B65G 43/00* (2006.01)

(52) U.S. Cl.
CPC ............. *B65G 35/06* (2013.01); *B65G 43/00* (2013.01)

(58) Field of Classification Search
CPC ................................ B65G 35/06; B65G 43/00
USPC ...................... 198/463.1, 463.2, 465.1, 465.4
See application file for complete search history.

(56) References Cited

U.S. PATENT DOCUMENTS

| 4,793,262 | A | | 12/1988 | Horn | |
|---|---|---|---|---|---|
| 5,121,828 | A | * | 6/1992 | Wiatt | ...................... B29C 49/68 198/465.1 |
| 5,551,552 | A | * | 9/1996 | Ophardt | .............. B05B 13/0221 198/465.1 |
| 6,216,847 | B1 | * | 4/2001 | Schmidt | ................ B65G 47/53 198/463.3 |

(Continued)

FOREIGN PATENT DOCUMENTS

| CN | 101670942 B | 2/2012 |
|---|---|---|
| CN | 104709685 A | 6/2015 |

(Continued)

*Primary Examiner* — Douglas A Hess
(74) *Attorney, Agent, or Firm* — Smartpat PLC

(57) ABSTRACT

The invention relates to a rail module (1) having rail portions (2) and having a linear drive for moving a rail-bound carriage. The linear drive has at least one drive module (4) which can be brought into operative connection with at least one reaction element. Here, the reaction element is secured, independently of the drive module (4), to the carriage in a drive region and the drive module (4) is arranged fixedly in relation to the rail module (1). When the rail module (1) is used as intended, the rail-bound carriage can be moved along at least a first or a second movement axis. The invention also relates to a rail transport system made up of at least two of the rail modules.

6 Claims, 4 Drawing Sheets

(56) References Cited

U.S. PATENT DOCUMENTS

| | | | |
|---|---|---|---|
| 7,014,033 B2 | 3/2006 | Sticht et al. | |
| 7,458,454 B2 * | 12/2008 | Mendenhall | B65G 35/06 198/377.02 |
| 7,584,017 B2 * | 9/2009 | Sugano | B65G 1/0485 198/370.03 |
| 7,757,834 B2 * | 7/2010 | Ruden | B23P 19/001 198/345.3 |
| 8,047,756 B2 * | 11/2011 | Tuffs | B60L 15/38 198/463.3 |
| 8,235,645 B2 * | 8/2012 | Garth | B21D 28/002 198/463.2 |
| 8,297,430 B2 * | 10/2012 | Van Den Goor | B65G 17/066 198/370.02 |
| 8,684,167 B2 * | 4/2014 | Harris | B65G 1/00 198/370.08 |
| 8,882,261 B2 * | 11/2014 | Spence | B41J 3/28 347/104 |
| 9,630,634 B2 * | 4/2017 | Nakamura | B61B 13/125 |
| 10,365,637 B2 * | 7/2019 | Mersnik | G05B 19/4183 |
| 2004/0134755 A1 | 7/2004 | Sticht et al. | |

FOREIGN PATENT DOCUMENTS

| | | |
|---|---|---|
| DE | 2309711 A1 | 9/1973 |
| DE | 7431495 U | 10/1976 |
| DE | 2839496 A1 | 3/1980 |
| DE | 3601699 A1 | 7/1987 |
| DE | 202005008319 U1 | 9/2005 |
| DE | 102009019135 A1 | 5/2011 |
| DE | 102011054310 A1 | 4/2013 |
| DE | 102013020716 A1 | 6/2015 |
| GB | 1410652 A | 10/1975 |
| WO | 02072453 A2 | 9/2002 |

* cited by examiner

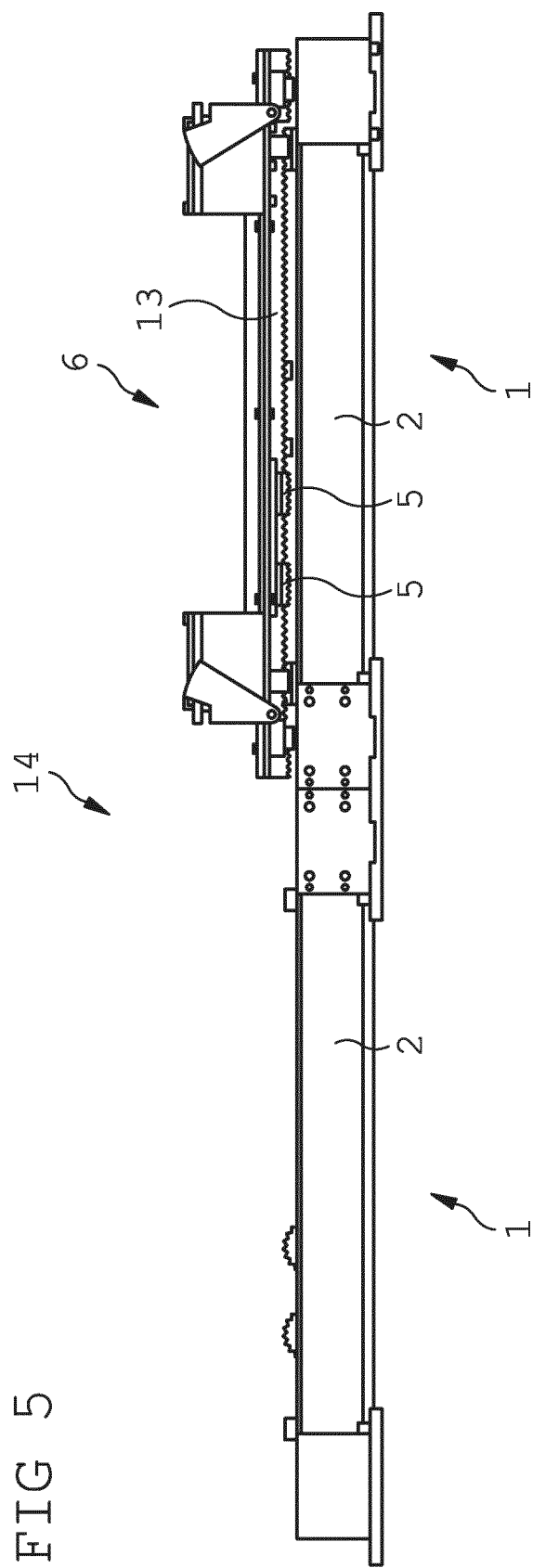

RAIL MODULE HAVING RAIL PORTIONS AND HAVING A LINEAR DRIVE, CARRIAGE FOR A RAIL MODULE AND RAIL TRANSPORT SYSTEM

TECHNICAL FIELD

The disclosure relates to a rail module having rail portions and having a linear drive for moving a rail-bound carriage. The invention also relates to a carriage for a rail module and to a rail transport system having at least one rail module.

BACKGROUND

In order to ensure the efficiency and effectiveness of logistics processes, it is useful to achieve the highest possible degree of automation. An example of this is the method for transferring material from a rail-bound driven roller conveyor to a drivable roller conveyor constituting a storage area and the device suitable for carrying out the method as described in DE 28 39 496 A1. Furthermore, a conveying system for transporting flight luggage is known from DE 10 2009 019 135 A1, in which self-propelling and individually driven containers are used.

In the high-bay warehouses sector, for example, the use of automated conveying systems has been common practice for several years. Because of the relatively large amount of space available in these high-bay warehouses, it was possible to implement these systems there from very early on. A relevant method and a device suitable for carrying out the method are described e.g. in DE 10 2013 020 716 A1. In other logistics sectors, e.g. in smaller warehouses, automated systems have been and are being introduced according to the state of technical development. The smaller and more complex a logistics sector, the more costly and technically challenging the implementation of automated conveying systems. In DE 10 2011 054 310 A1, for example, an assembly for transporting products from the tobacco industry is described, which has rails and autonomously moving transport vehicles adapted to the rails.

In order to reduce turnaround times of transport vehicles, systems have also been developed over the last few decades which, for example, enable the cargo of a transport vehicle to be unloaded not manually but by means of an unloading system. In the paper transport sector, for example, systems are known which enable a complete load floor of a transport vehicle together with rolls of paper arranged on the load floor to be moved out of the transport vehicle in order to unload it in one piece in this way.

A variety of technical solutions are also known from other logistics and engineering sectors for simplifying and rationalizing logistics processes. For example, in DE 74 31 495 U a battery-changing device is described, which is movable on casters and which has rails for batteries arranged on a frame. In addition, from DE 23 09 711 A, a rail-bound transport system is known, having self-driven, steerable carriages which are controllable on the rails of the transport system by means of passive control means.

In certain specialized logistics sectors, it has previously been impossible to achieve a useful degree of automation of a loading operation. Purely by way of example, the resupplying of aircraft with catering goods may be mentioned. The catering goods here are located in catering trolleys, which are arranged inside a container. This container is often in the form of a high-lift box of a high-lift box lorry. Because of their varied nature, these still have to be loaded manually by logistics staff. This leads to prolonged turnaround times, which reduces the operating time of the aircraft in the air and thus increases the operating costs of the aircraft. The conveying systems known from the high-bay warehousing sector cannot be used in this specialized sector since, despite advances in systems miniaturization, they are still too big and heavy for this type of use, particularly since, in the high-lift box lorries that are often used, the load compartment is lifted up to the level of a loading hatch of an aircraft by means of a lifting device. In these systems, the weight of the high-lift box should be kept as low as possible for reasons of efficiency and safety.

This special logistics procedure is likewise unsuitable for automation with the known systems for loading and unloading goods vehicles since, as a rule, the cargo in a high-lift box is not intended exclusively for one aircraft; instead, one high-lift box is intended for loading multiple aircraft. It is therefore necessary for individual items of cargo to be removable from the high-lift box in a targeted manner.

With the technical solutions currently available, therefore, it is not possible to unload general cargo, e.g. catering trolleys, from a load compartment, e.g. a high-lift box of a high-lift box lorry, in an automated and targeted manner.

SUMMARY

It is regarded as an object of the present disclosure to provide a rail module having rail portions, a carriage for a rail module and a rail transport system, so that general cargo can be moved simply and in a targeted manner within a logistical area.

This object is achieved in a rail module of the above-mentioned type in that the linear drive has at least one drive module which can be brought into operative connection with at least one reaction element, wherein when the reaction element and the carriage are used as intended, the at least one reaction element is secured, independently of the drive module, to the carriage in a drive region and the drive region faces the drive module when the carriage is arranged as intended on the rail portions, wherein the drive module is arranged fixedly in relation to the rail module, wherein the drive module has at least one first and at least one second drive apparatus for driving the carriage along at least one first and along at least one second movement axis, wherein at least one work machine is assigned to each drive apparatus and wherein each drive apparatus has a drive means driven by the work machine, wherein the drive means and the at least one reaction element are adapted to each other and arranged in relation to each other such that, when the rail module is used as intended, by means of the reaction element a drive action of the drive means of a drive apparatus is converted to a translational movement of the carriage along one of the movement axes assigned to the drive apparatus, so that the rail-bound carriage can be moved along one of the movement axes.

Such a configuration of the rail module enables rail-bound carriages to be moved along the rail portions of the rail module. In contrast to the known technical solutions, with the rail module presented here this is possible in at least two directions of movement. Owing to the use of fixed drive modules, there is no need to equip the rail-bound carriages with their own drive means. As a result, the unit costs for each carriage can be reduced significantly compared to a system with self-driven carriages. Since the carriages only have to be adapted to the rail modules and provided with a reaction element, the costs for both producing the corresponding carriages and maintaining the carriages are reduced compared to systems with self-driven carriages.

Both for the drive apparatus and for the drive means, different drive concepts can be provided. These can be friction wheel drives, gear drives, chain drives, linear direct drives and/or other drives.

To produce the operative connection between the drive means and the reaction element, various non-positive and/or positive power transmission methods are suitable. These can be hook connections, gears, frictional connections and/or other power transmission methods. It is advantageously provided that the rail portions of the rail module are secured to the rail module in a releasable manner. By means of such a configuration of the rail module, the replacement of individual rail portions in the event of a defect is facilitated.

It is advantageously provided that at least one work machine is assigned to each movement axis. Assigning a work machine to each movement axis in the rail module enables a direct control of each drive apparatus to be readily achieved for each direction of movement. As a result, the mechanical complexity of the rail module can be minimized, which has a positive effect on both the production costs and the durability of the rail module.

The drive means may have a disc-shaped or cylindrical basic body, wherein the drive means can be brought into rotation by the work machine. The use of drive means with a disc-shaped or cylindrical basic body, such as e.g. friction wheels, pulleys or pinions, is widespread in mechanical engineering, familiar to the person skilled in the art and thoroughly understood. As a result of such a configuration of the rail module, this can be constructed from commercially available, tried and tested machine elements.

It is advantageously provided according that the drive means is a pinion and that the reaction element has at least one rack which can engage with the pinion. The combination of racks with pinions is a way of producing a drive for a machine part that is common in mechanical engineering, familiar to the person skilled in the art and thoroughly understood. By means of a positive connection between the pinion and a rack, power can be transmitted very efficiently, such a drive being additionally distinguished by low susceptibility to faults.

The disclosure also relates to a carriage for a rail module wherein, in the drive region of the carriage, beside the rack at least one meshing engagement aid is arranged, wherein the meshing engagement aid is formed in a substantially rack-like manner, wherein meshing engagement aid teeth are arranged in alignment with teeth of the rack, wherein the meshing engagement aid has an insertion side and a feed side and the feed side faces a rack portion of the rack, wherein a feed tooth pitch and/or depth in feed tooth portions of meshing engagement aid teeth are adapted on the feed side to a tooth pitch and/or depth of teeth of the rack in the rack portion, wherein an insertion tooth pitch in insertion tooth portions of meshing engagement aid teeth is greater on the insertion side than the feed tooth pitch and/or an insertion tooth depth in insertion tooth portions of the meshing engagement aid teeth is smaller on the insertion side than the feed tooth depth, wherein the meshing engagement aid teeth each run continuously from the insertion side to the feed side, so that when the carriage is moved transversely to the movement axis of a drive means, the rack that is arranged on the carriage can, in a trouble-free manner, be meshed with a pinion of the drive apparatus of the rail module or guided thereover.

The disclosure also relates to a rail transport system having at least one rail module and having the carriage, wherein the carriage has a reaction element arranged in the work area. The rail transport system and the carriage enable a load which is arranged on the carriage to be moved along the rail transport system. By means of the drive means of the rail module in this case, a targeted movement of the carriage can take place. It is furthermore possible that multiple carriages can be moved using the at least one rail module of the rail transport system.

Furthermore, it can be provided that at least one first rail module and at least one second rail module are arranged in relation to each other such that at least one first drive means of the first rail module and a second drive means of the second rail module are always simultaneously in operative connection with at least one reaction element arranged on the carriage, wherein the rail portions of the rail modules are arranged in alignment with each other, so that the rail portions of the rail modules form at least one rail track, wherein the carriage can be displaced along the rail track from a work area of the first rail module into a work area of the second rail module. Where multiple rail modules are combined within the rail transport system, it is provided that a transfer of the reaction element between the rail modules must be able to take place to enable the carriage to be moved along the rail track. By combining a plurality of rail modules, a movement of the carriage over relatively long distances is made possible. It is likewise provided that multiple carriages can also be moved simultaneously in the area of the at least two rail modules. Since in this case the control of the carriages takes place only via the rail modules and thus no separate open-loop and/or closed-loop control of the carriages has to be provided, on the one hand the risk of accidents between individual carriages can be reduced and on the other hand the unit costs for each individual carriage can be reduced since no complex and cost-intensive control system has to be installed.

It can be provided that, using the rail modules, at least one first rail track is formed along a first movement axis and at least one second rail track is formed along a second movement axis, wherein the carriage can be moved at least from the first into the second rail track. Such a configuration of the rail transport system enables the carriage to be moved in a targeted manner within the rail transport system from a first position to a second position. It is likewise possible, using the rail transport system, that a plurality of carriages can be moved within the rail transport system such that logistics staff can access one or more specific carriages of the rail transport system without themselves having to enter the area of the rail transport system or to displace individual carriages manually.

Particularly when a rack is used as the reaction element and a pinion as the drive means, it can advantageously be provided in the carriage of the rail transport system that in the drive region of the carriage beside the rack a meshing engagement aid is arranged, wherein the meshing engagement aid is formed in a substantially rack-like manner, wherein teeth of the meshing engagement aid are arranged in alignment with teeth of the rack, wherein the meshing engagement aid has an insertion side and a feed side and the feed side faces a rack portion of the rack, wherein a feed tooth pitch and/or depth in feed tooth portions of teeth of the meshing engagement aid are adapted on the feed side to a tooth pitch and/or depth of teeth of the rack in the rack portion, wherein an insertion tooth pitch in insertion tooth portions of teeth of the meshing engagement aid is greater on the insertion side than the feed tooth pitch and/or an insertion tooth depth in insertion tooth portions of the teeth of the meshing engagement aid is smaller on the insertion side than the feed tooth depth, wherein the teeth each run continuously from the insertion side to the feed side, so that when the carriage is moved transversely to the movement axis of a drive means, the rack arranged on the carriage can, in a trouble-free manner, be meshed with a pinion of the drive apparatus of the rail module or guided thereover. Such a configuration of the carriage of the rail transport system enables the teeth of the pinion to be displaced by means of the meshing engagement aid when the rack is moved close to the pinion during a transverse movement of the carriage such that teeth of the pinion and teeth of the rack of the carriage are effectively prevented from clashing.

It can furthermore be provided that at least the first movement axis of the first rail track is arranged orthogonally to the second movement axis of the second rail track. In order to make the rail transport system as space-saving as possible, it is expedient for the tracks of the rail transport system to form a system of tracks arranged at right angles and parallel to each other. It can likewise be provided that the individual rail modules are also held together mechanically, e.g. by a frame, so that the rail transport system is designed as a structure that can be handled as a cohesive whole.

To enable the carriages of the rail transport system to be handled expediently, it is provided that the control of the drive apparatus of the rail modules takes place indirectly or directly by means of a central data processing apparatus, so that at least one carriage can be displaced according to at least one rule of order by means of the rail transport system. Such a configuration of the rail transport system enables even extensive rail transport systems with a large number of carriages to be employed expediently.

Further advantageous embodiments of a rail transport system are explained in more detail with reference to exemplary embodiments shown in the drawings.

BRIEF DESCRIPTION OF THE DRAWINGS

The figures show the following:
FIG. 5 shows a schematic view of the rail transport system.

DETAILED DESCRIPTION

Figure 1:
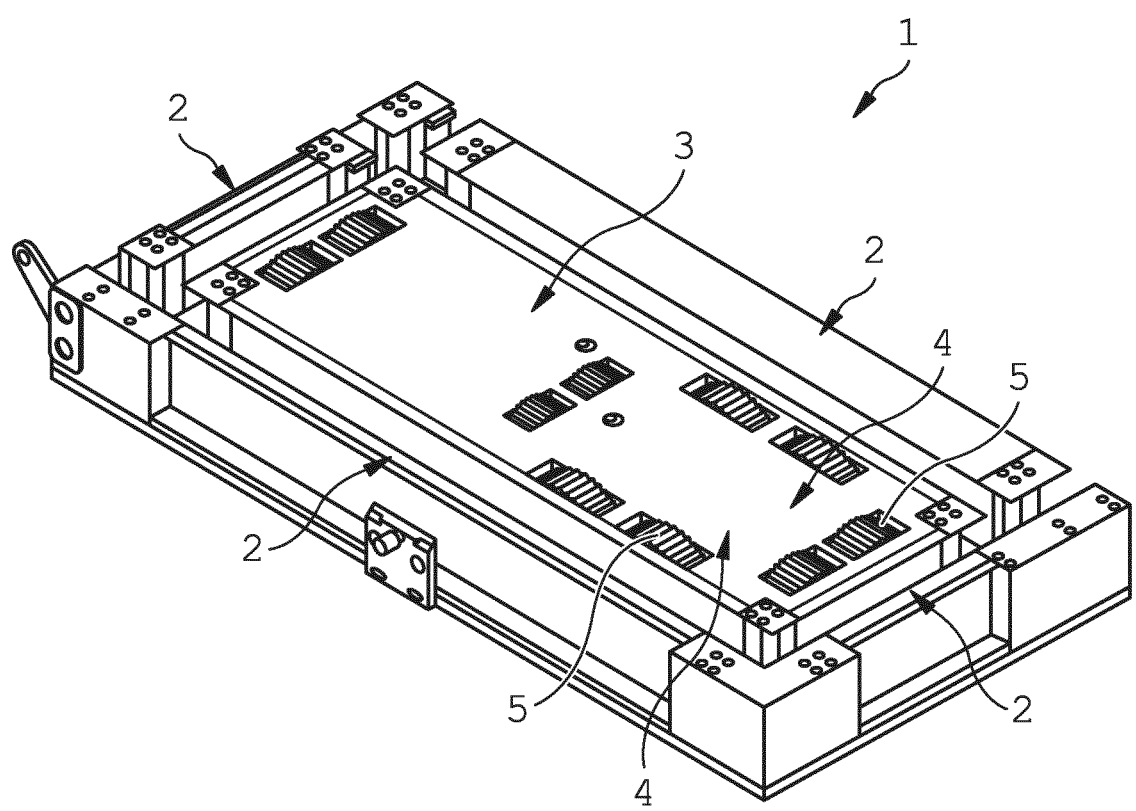
FIG. 1 shows a schematic view of the rail module.

FIG. 1 shows a diagram of a rail module 1 with rail portions 2 and with a linear drive for moving a rail-bound carriage (not shown). The linear drive has a drive module 3, which can be brought into operative connection with a reaction element (not shown) arranged in a drive region of the carriage. The drive region of the carriage faces the drive module 3 when the carriage is arranged as intended on the rail portions 2. The drive module 3 is arranged fixedly in relation to the rail module 1 and has two drive apparatuses 4 to drive the carriage along rail portions 2. A work machine (not shown) is assigned to each drive apparatus 4 and each drive apparatus 4 has a drive means 5. The drive means 5 and the reaction element (not shown) are adapted to each other and arranged in relation to each other such that, when the rail module 1 is used as intended, a drive action of the drive means 5 of a drive apparatus 4 is converted by means of the reaction element to a translational movement of the carriage along a rail portion assigned to the drive apparatus 4, so that the rail-bound carriage can be moved along one of the rail portions.

Figure 2:
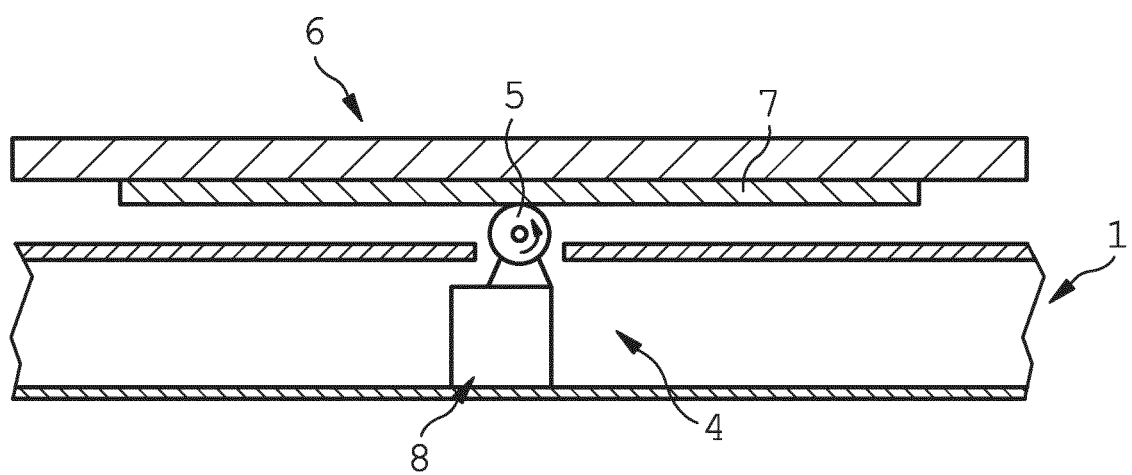
FIG. 2 shows a schematic sectional view of the drive apparatus and of the carriage.

FIG. 2 shows a schematic sectional drawing of part of a rail module 1, wherein the rail module 1 has a drive apparatus 4 and the drive apparatus 4 is in operative connection, via a drive means 5, with a reaction element 7 which is secured to a carriage 6. The illustrated drive apparatus 4 of the rail module 1 has a work machine 8, which drives the drive means 5. The drive means 5 has a disc-shaped basic body and is brought into rotation by the work machine. By means of the operative connection between the drive means 5 and the reaction element 7, the carriage 6 is indirectly moved by the work machine 8.

Figure 3:
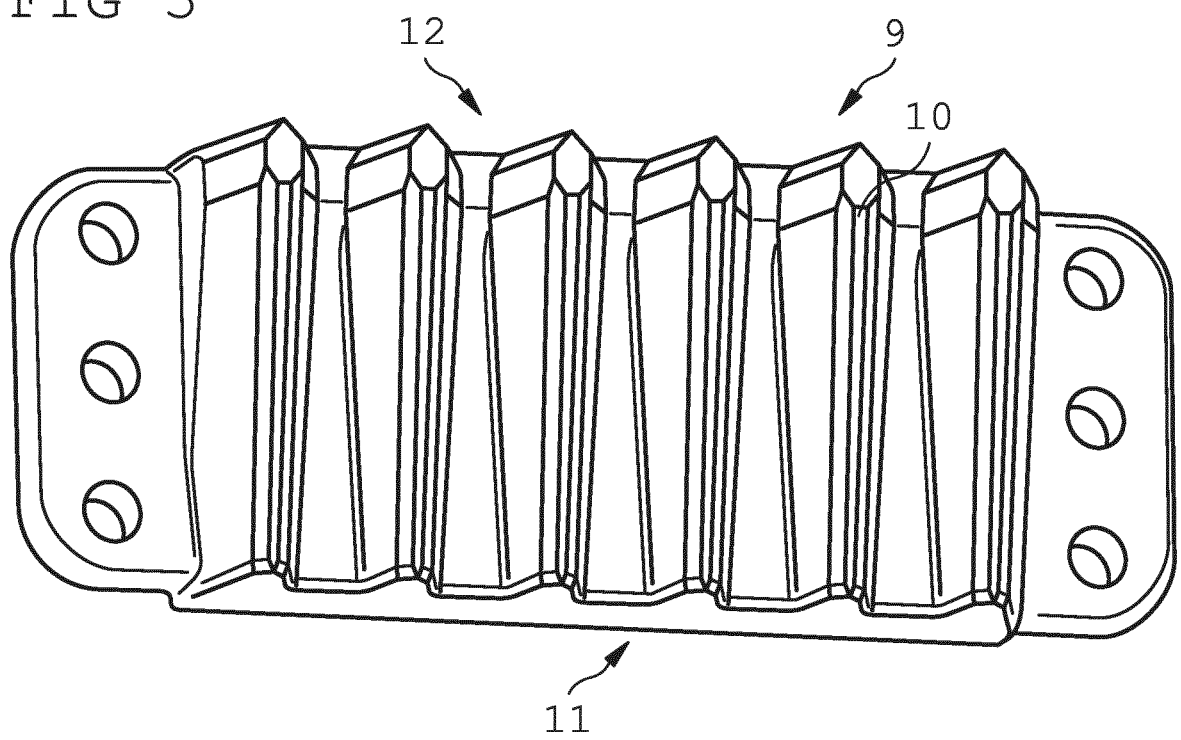
FIG. 3 shows a schematic view of the meshing engagement aid.

FIG. 3 shows a diagram of a meshing engagement aid 9. The meshing engagement aid 9 is formed in a substantially rack-like manner and has meshing engagement aid teeth 10 which can be arranged in alignment with teeth of a rack (not shown) arranged in the drive region of a carriage (not shown), and one of which is labelled by way of example. The meshing engagement aid 9 has an insertion side 11 and a feed side 12. The feed side 12 should face a rack portion of the rack when the meshing engagement aid 9 is used as intended. As a result of the meshing engagement aid 9 it is ensured that teeth of a pinion (not shown) do not clash with teeth of the rack during a transverse movement of the carriage, but that the teeth of the pinion are oriented by means of the meshing engagement aid 9 such that they intermesh in a trouble-free manner with the teeth of the rack.

Figure 4:
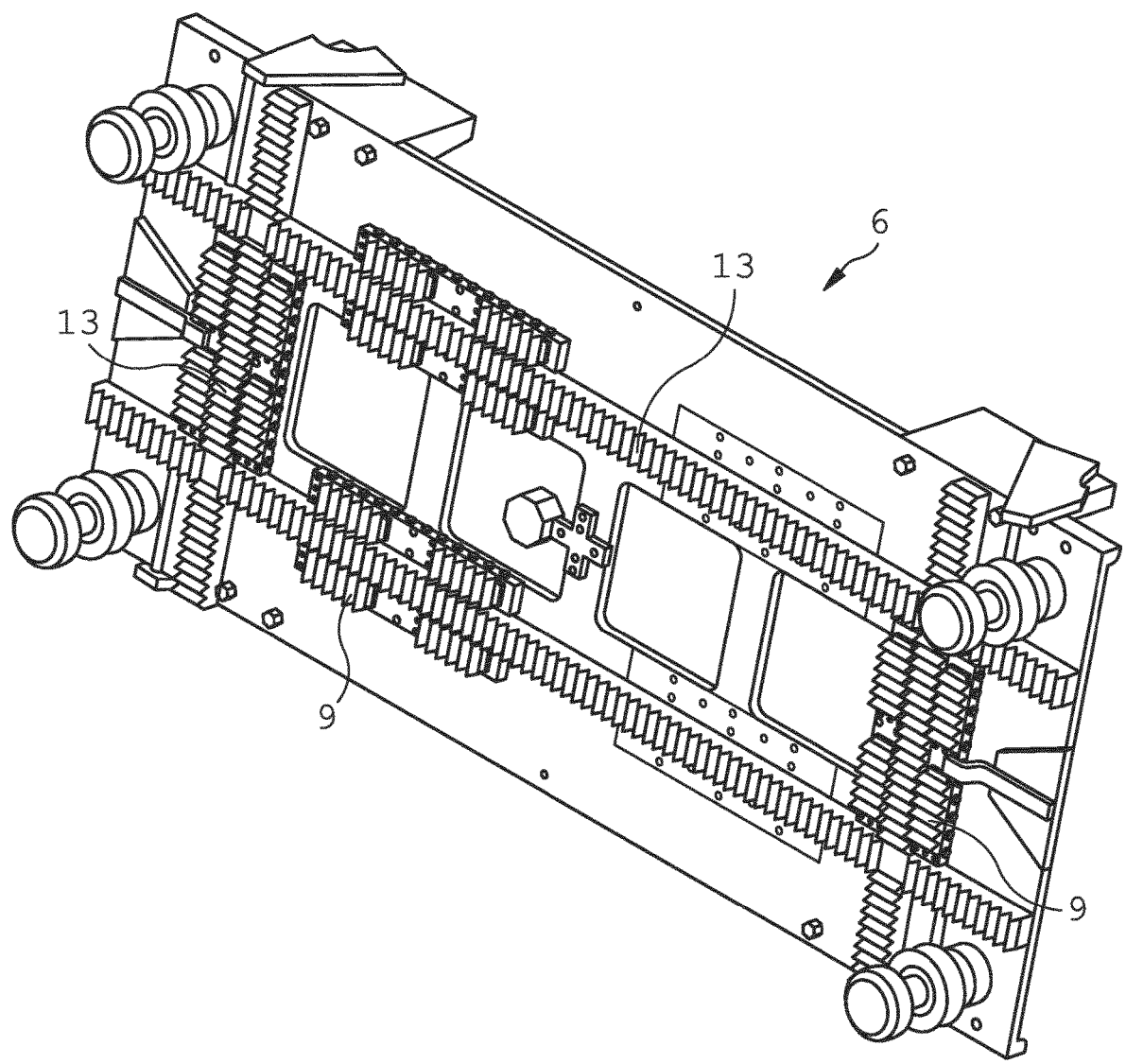
FIG. 4 shows a schematic view of the underside of the carriage.

FIG. 4 shows a diagram of a carriage 6. The carriage 6 has multiple racks 13, two of which are labelled by way of example. Beside the racks 13, multiple meshing engagement aids 9 are arranged, two of which are shown by way of example. In order to enable the carriage to be moved within the rail transport system in more than one direction, it is provided that the carriage 6 has at least one rack 13 for each direction of movement that is provided.

FIG. 5 shows a diagram of a rail transport system 14. The rail transport system has two rail modules 1 coupled together and a carriage 6. The carriage 6 is guided by the rail portions 2 of the rail modules 1. The carriage 6 has racks 13, one of which is labelled by way of example, wherein the rack 13 is in operative connection with two drive means 5.

The invention claimed is:

1. A rail-bound carriage (6) for a rail module (1), the rail module comprising
rail portions (2) and
a linear drive for moving the rail-bound carriage (6),
wherein the linear drive has at least one drive module (3), which can be brought into operative connection with at least one reaction element (7),
wherein, when the reaction element (7) and the carriage (6) are used as intended, the at least one reaction element (7) is secured independently of the drive module (3) to the carriage in a drive region and the drive region faces the drive module (3) when the carriage is arranged as intended on the rail portions (2),
wherein the drive module (3) is arranged fixedly in relation to the rail module (1),
wherein the drive module (3) has at least one first and at least one second drive apparatus (4) for driving the carriage (6) along at least one first and along at least one second movement axis,
wherein at least one work machine (8) is assigned to each drive apparatus (4) and each movement axis and wherein each drive apparatus (4) has a pinion (5) driven by the work machine (8), wherein the pinion (5) and the at least one reaction element (7) are adapted to each other and arranged in relation to each other such that, when the rail module (1) is used as intended, by means of the reaction element (7) a drive action of the pinion (5) of a drive apparatus (4) is converted to a translational movement of the carriage (6) along a movement axis assigned to the drive apparatus (4), so that the rail-bound carriage (6) can be moved along one of the movement axes, wherein the pinion (5) has a disc-shaped or cylindrical basic body, wherein the pinion (5) can be brought into rotation by the work machine (8), wherein the reaction element (7) has at least one rack (13), which can engage with the pinion, wherein, beside the rack (13), at least one meshing engagement aid (9) is arranged in the drive region of the carriage (6), wherein the meshing engagement aid (9) is an elongated bar having teeth (10) which are arranged in alignment with teeth of the rack (13), wherein the meshing engagement aid (9) has an insertion side (11) and a feed side (12), the feed side (12) facing a rack portion of the rack (13), wherein a feed tooth pitch and/or depth in feed tooth portions of meshing engagement aid teeth (10) are adapted on the feed side (12) to a tooth pitch and/or depth of teeth of the rack (13) in the rack portion, wherein an insertion tooth pitch in insertion tooth portions of the meshing engagement aid teeth (10) is greater on the insertion side (11) than the feed tooth pitch and/or an insertion tooth depth in insertion tooth portions of the meshing engagement aid teeth (10) is smaller on the insertion side (11) than the feed tooth depth, and wherein the meshing engagement aid teeth (10) each run continuously from the insertion side (11) to the feed side (12), so that when the carriage (6) is moved transversely to the movement axis of a pinion (5) the rack (13) arranged on the carriage (6) can, in a trouble-free manner, be meshed with a pinion of the drive apparatus (4) of the rail module (1) or guided thereover.

2. A rail transport system (14) comprising at least one first rail module and the carriage (6) according to claim 1, wherein the carriage (6) has the reaction element (7) arranged in a work area.

3. The rail transport system (14) according to claim 2, wherein the at least one first rail module (1) and at least one second rail module (1) are arranged in relation to each other such that at least one first pinion (5) of the first rail module (1) and a second pinion of the second rail module (1) are always simultaneously in operative connection with the reaction element (7) arranged on the carriage (6), wherein the rail portions (2) of the rail modules (1) are arranged in alignment with each other, so that the rail portions (2) of the rail modules (1) form at least one rail track, wherein the carriage can be displaced along the rail track from a work area of the first rail module (1) into a work area of the second rail module (1).

4. The rail transport system (14) according to claim 3, wherein, using the rail modules (1), at least one first rail track is formed along a first movement axis and at least one second rail track is formed along a second movement axis, wherein the carriage (6) can be moved at least from the at least one first rail track into the at least one second rail track.

5. The rail transport system (14) according to claim 4, wherein at least the first movement axis of the first rail track is arranged orthogonally to the second movement axis of the second rail track.

6. The rail transport system (14) according to claim 2, wherein the control of the drive apparatuses (4) of the rail modules (1) takes place indirectly or directly by means of a central data processing apparatus, so that at least one carriage (6) can be displaced according to at least one rule of order by means of the rail transport system (14).

* * * * *